United States Patent [19]

Arnold

[11] Patent Number: 4,667,643
[45] Date of Patent: May 26, 1987

[54] HEATED FUEL VAPOURIZER AND SLIDABLE THROTTLE VALVE

[75] Inventor: Bruce M. Arnold, Victoria, Canada

[73] Assignee: International Mileage Master, Ltd., Victoria, Canada

[21] Appl. No.: 803,955

[22] Filed: Dec. 2, 1985

[51] Int. Cl.$^4$ ............................................. F02G 5/00
[52] U.S. Cl. .................................. 123/545; 123/25 P; 123/557
[58] Field of Search .............. 123/543, 545, 547, 557, 123/554, 25 P, 25 B

[56] References Cited

U.S. PATENT DOCUMENTS

| | | | |
|---|---|---|---|
| 3,907,946 | 9/1975 | Brown | 123/549 |
| 3,968,775 | 7/1976 | Harpman | 123/25 B |
| 4,030,457 | 6/1977 | Hawryluk | 123/545 |
| 4,213,433 | 7/1980 | Day | 123/549 |
| 4,323,044 | 4/1982 | Erwin et al. | 123/557 |
| 4,336,783 | 6/1982 | Henson | 123/557 |
| 4,429,675 | 2/1984 | Talbert | 123/557 |
| 4,455,986 | 6/1984 | Finken | 123/557 |
| 4,458,653 | 7/1984 | Geddes et al. | 123/554 |
| 4,515,135 | 5/1985 | Glass | 123/557 |
| 4,542,717 | 9/1985 | Choe | 123/543 |

FOREIGN PATENT DOCUMENTS 348431 10/1919 Fed. Rep. of Germany .
2120724 12/1983 United Kingdom .

Primary Examiner—Charles J. Myhre
Assistant Examiner—David A. Okonsky
Attorney, Agent, or Firm—Chernoff, Vilhauer, McClung & Stenzel

[57] ABSTRACT

Apparatus for supplying a gaseous fuel mixture to a combustion chamber. A fuel vaporizer vaporizes liquid fuel which is then mixed with air. The vaporizer and mixing chamber are heated to maintain the temperature of the vaporized fuel/air mixture. The vaporizer and mixing chamber are also interconnected so that vaporized fuel is discharged directly from the vaporizer into the mixing chamber. A simplified valve for controlling the quantity of vaporized fuel discharged into the mixing chamber is provided.

5 Claims, 7 Drawing Figures

HEATED FUEL VAPOURIZER AND SLIDABLE THROTTLE VALVE

FIELD OF THE INVENTION

This application pertains to apparatus for supplying a vapourized fuel mixture to a combustion chamber. More particularly, the application pertains to a heated fuel atomizer for supplying hot vapourized fuel to a combustion chamber. The application also pertains to a slidable throttle valve for controlling the passage of fuel to a combustion chamber.

BACKGROUND OF THE INVENTON

It is known that the operating efficiency of an internal combustion engine (or other device having a combustion chamber, such as a furnace) may be improved by supplying vapourized fuel to the combustion chamber instead of fuel droplets as are supplied by conventional carburetors. It is also known that the operating efficiency of an internal combustion engine may be improved by heating the fuel supplied to the combustion chamber (whether the fuel is supplied in vapour or droplet form). An internal combustion engine fuelled with a hot, dry vapourized fuel/air mixture will generally consume less fuel than an engine fuelled with the more conventional fuel droplet/air mixture and may therefore be operated more economically.

Problems have however been encountered in achieving the operating efficiencies and economies theoretically attainable by fuelling an internal combustion engine with a hot, dry vapourized fuel/air mixture. For example, problems have been encountered in cold-starting engines fuelled on vapours alone and in attempting to switch a warm engine from fuel droplet to fuel vapour operation. Further problems have been encountered in controlling the fuel/air mixture to obtain adequate operating power (particularly under heavy load conditions), and in obtaining smooth and adequate acceleration. Overheating problems have also been encountered with prior art vapour fuelling systems. Concomittant safety problems (caused by the danger of exposing fuel vapours to a heat source) have also been experienced. The inventor believes that such problems may largely be traced to a physical separation, in prior art devices, between the point at which the fuel is vapourized and the mixing chamber in which the vapourized fuel is mixed with air before the fuel/air mixture is introduced into the combustion chamber. This physical separation has typically necessitated the provision of a conduit for transporting vapourized fuel from a fuel vapourizer to the mixing chamber. In some prior art devices this conduit is heated in order to raise the temperature of the vapourized fuel before it is introduced into the combustion chamber. This is not only potentially unsafe (due to the extreme explosive potential caused by exposing vapourized fuel to a heat source) but also potentially inefficient in view of the difficulties of ensuring that the conduit is adequately heated and/or insulated over its entire length. If the conduit is not adequately heated and/or insulated, then the vapourized fuel may be significantly cooled before it reaches the mixing chamber, thereby diminishing the operational advantages mentioned above.

The present invention overcomes the foregoing problems by providing a fuel vapourizer which is carefully positioned relative to the fuel/air mixing chamber so that vapourized fuel may be discharged directly into the mixing chamber and so that both the vapourizer and the mixing chamber may be heated to maintain the temperature of the vapourized fuel/air mixture near a temperature selected to yield maximum engine operating efficiencies.

SUMMARY OF THE INVENTION

In accordance with a first aspect, the invention provides apparatus for supplying a gaseous fuel mixture to a combustion chamber. The apparatus comprises a fuel vapourizer for vapourizing liquid fuel; a mixing chamber for mixing the vapourized fuel with air; and, heating means for heating the vapourizer and the mixing chamber. The vapourizer and the mixing chamber are interconnected such that vapourized fuel produced by the vapourizer is discharged directly into the mixing chamber and thence directly into an intake manifold of the combustion chamber.

The apparatus further comprises valve means which interconnects the vapourizer with the mixing chamber. The valve means controls the quantity of vapourized fuel discharged into the mixing chamber. Preferably, the valve means comprises a tubular sleeve having an open first end, a closed second end, and a fuel delivery orifice between the first and second ends. A control element is slidably disposed within the sleeve to controllably cover and uncover the fuel delivery orifice.

Advantageously, a needle valve is provided for controlling the quantity of fuel vapourized by the vapourizer. A restrictor is also advantageously provided to restrict the passage of liquid fuel into the fuel delivery orifice.

The apparatus may also comprise steam injection means for controllably injecting steam into the mixing chamber.

DETAILED DESCRIPTION OF THE PREFERRED EMBODIMENT OF THE INVENTION

Figure 1:
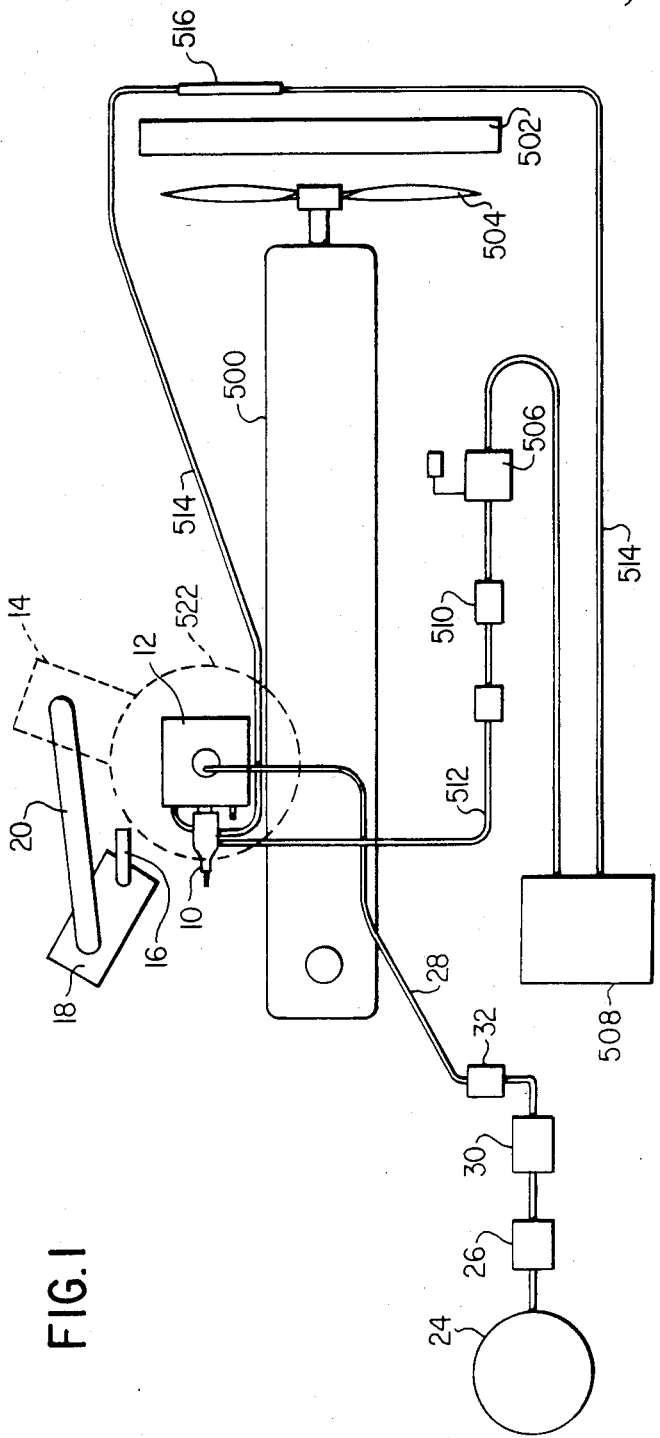
FIG. 1 is a block diagram which illustrates the principal components of the invention adapted for use with an internal combustion engine.

FIG. 1 is a block diagram which illustrates a conventional internal combustion engine 500 having a radiator 502 and a cooling fan 504. A conventional fuel pump 506 is also provided for pumping fuel from fuel tank 508 for subsequent delivery to the combustion chambers of engine 500. A conventional fuel filter 510 removes sediment from the fuel as it passes through fuel line 512.

Liquid fuel is thus delivered through fuel line 512 to fuel vapourizer 10 which vapourizes the liquid fuel. Vapourizer 10 is coupled directly to mixing chamber 12 such that vapourized fuel produced by vapourizer 10 is discharged directly from vapourizer 10 into mixing chamber 12, thereby minimizing cooling of the fuel which is heated as hereafter described. Within mixing chamber 12 the vapourized fuel is mixed with air supplied via air inlet duct 14 and is then delivered to the combustion chambers of engine 500.

Figure 7:
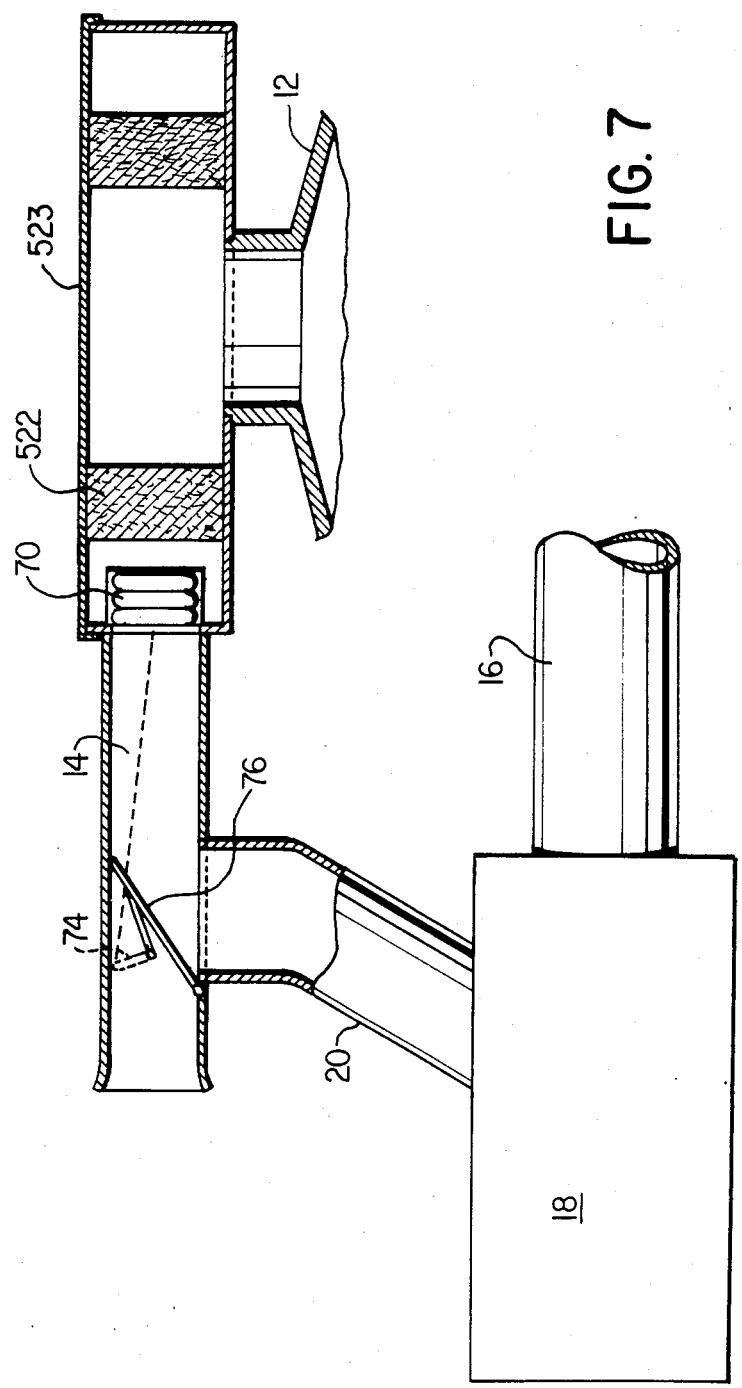

Vapourizer 10 and mixing chamber 12 are heated by passing hot engine exhaust gases through passages provided within vapourizer 10 and mixing chamber 12. Ambient air passed into mixing chamber 12 is also preheated by passing it, as shown in FIG. 7, through conduit 16 to heat exchanger 18 (which is in thermal contact with a hot engine part) and then through conduit 20 for discharge into inlet duct 14 from which the heated air passes through conventional air filter 522 and then into mixing chamber 12.

Fuel pump 506 supplies liquid fuel under pressure to vapourizer 10. Accordingly, a fuel return line 514 is provided for returning excess fuel from vapourizer 10 to fuel tank 508. Fuel returned to tank 508 via line 514 is first passed through radiator 516 to cool the fuel which is heated by its passage through heated vapourizer 10.

The apparatus of the preferred embodiment also includes "steam injection means" for controllably injecting steam into mixing chamber 12. The steam injection means of the preferred embodiment includes a water storage tank 24, a water pump 26 for pumping water from tank 24 through water delivery line 28 and through water filter 30 to a second heat exchanger 32 which utilizes heat given off by the combustion process within engine 500 to convert the water to steam. The steam is subsequently delivered for injection into mixing chamber 12 with the aid of a commercially available water injection apparatus such as that sold under the trade mark EDELBROCK VARA-INJECTION.

Figure 4:
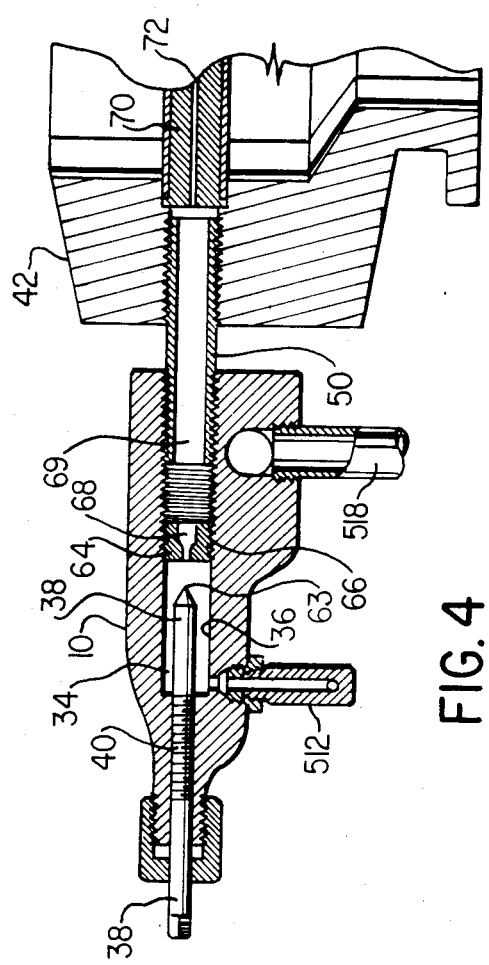
FIG. 4 is a cross-sectional view taken with respect to the line IV—IV shown in FIG. 2.
Figure 5:
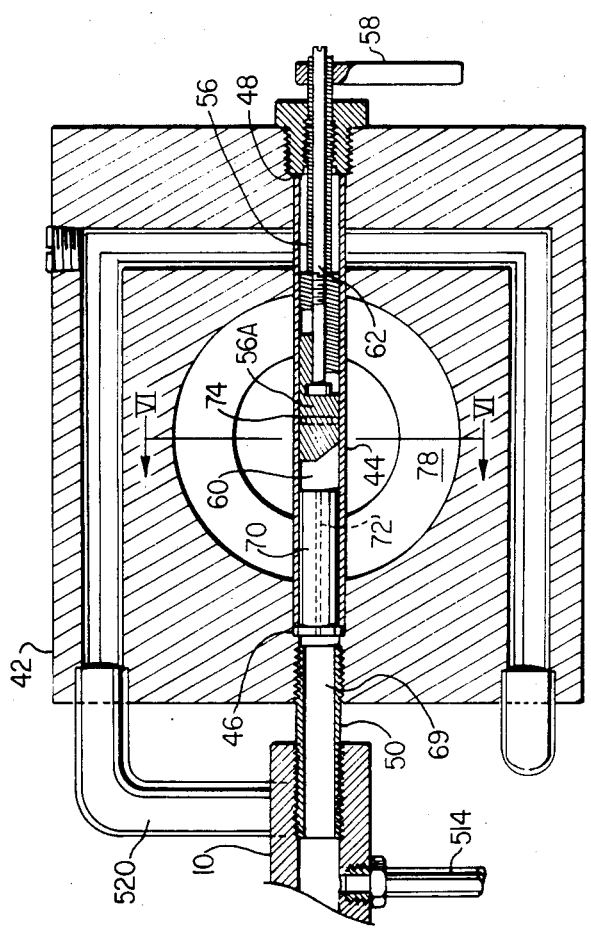
FIG. 5 is a cross-sectional view taken with respect to the line V—V shown in FIG. 3.

As may be seen in FIG. 4, liquid fuel supplied to vapourizer 10 via fuel line 512 passes into reservoir 34 defined between the inner surface of a cylindrical aperture 36 bored through vapourizer 10 and the outer surface of shaft 38 which projects longitudinally into aperture 36. Shaft 38 is threaded as shown at 40 so that it may be threadably connected to vapourizer 10 for adjustment in the manner hereinafter described. The fuel is forced through orifice 68 of metering jet 64 and, then, in vapourized form, into fuel vapourization zone 69. A restrictor 70 having a small fuel passage 72 passes vapourized fuel from vapourization zone 69 to fuel delivery zone 60 (FIG. 5). Restrictor 70 inhibits flooding of mixing chamber 12 when engine 500 is switched off.

The apparatus of the preferred embodiment further comprises a "valve means" for interconnecting vapourizer 10 and mixing chamber 12 in a manner which facilitates control of the quantity of vapourized fuel discharged into mixing chamber 12. The valve means of the preferred embodiment is illustrated in FIG. 5 and will now be described. A tubular sleeve 44 having an open first end 46 and a closed second end 48 protrudes through the side of casing 42 opposite vapourizer 10. A second tubular sleeve 50 (the inner cylindrical wall of which defines an extension of aperture 36 and therefore an extension of fuel vapourization zone 69) is threadably connected to open end 46 of sleeve 44 and protrudes through the side of casing 42 to fit tightly within aperture 36 of vapourizer 10, to which it is also threadably connected. An elongate fuel delivery orifice 52 (FIG. 6) passes through sleeve 44 to direct vapourized fuel downwardly into mixing chamber 12.

A fuel metering rod comprising elements 56, 56A (FIG. 5) is disposed within the right hand end of sleeve 44 (as viewed in FIG. 5). Throttle linkage 58 is affixed to the end of element 56. Rod 62 passes through element 56 and is connected to element 56A, such that rotation of rod 62 in one direction causes element 56A to be slidably drawn toward element 56, whereas rotation of rod 62 in the opposite direction slidably forces element 56A away from element 56, thus providing a fine tune idle adjustment. Element 56A rotates with linkage 58 as it slides with respect to element 56. The left most end of element 56A is positioned to slide across orifice 52, thereby controllably covering and uncovering orifice 52 and thus varying the quantity of fuel which passes from fuel delivery zone 60 through orifice 52 into venturi 78 (FIG. 6) of mixing chamber 12. More particularly, the left most end of element 56A is bevelled so that it sweeps through a section of a cone as it rotates within tube 44, thus ensuring a smooth major variation in the opening of orifice 52 (i.e. in contrast to the minor variation caused by slidable displacement of element 56A as described above). When linkage 58 is positioned to force element 56A to its left most position (as viewed in FIG. 5) fuel passage through orifice 52 is largely inhibited by element 56A (i.e. the throttle control is positioned at "idle"). When linkage 58 is positioned to draw element 56A to its right most position fuel passage through orifice 52 is uninhibited by element 56A (i.e. the throttle control is in its "wide open" position). Seal 74 prevents passage of fuel over the slidable portions of elements 56, 56A, thereby preserving the lubricant for those elements.

Figure 2:
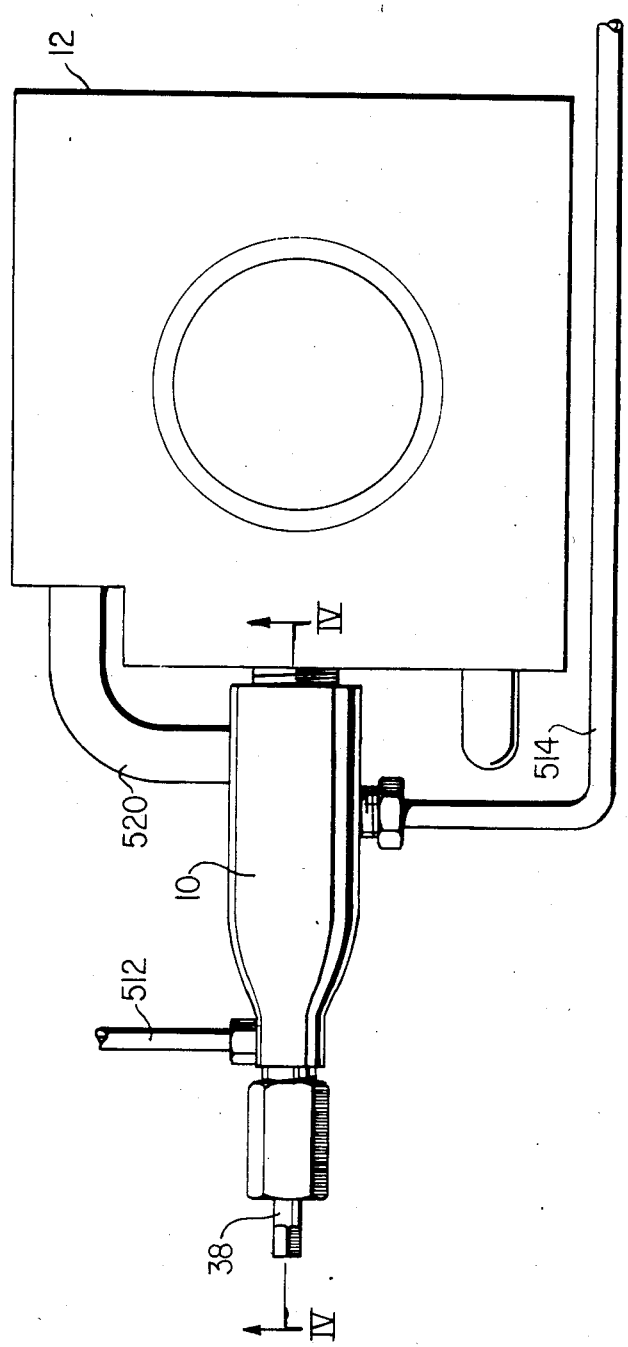
FIG. 2 is a top view of the fuel vapourizer and mixing chamber of the preferred embodiment.
Figure 3:
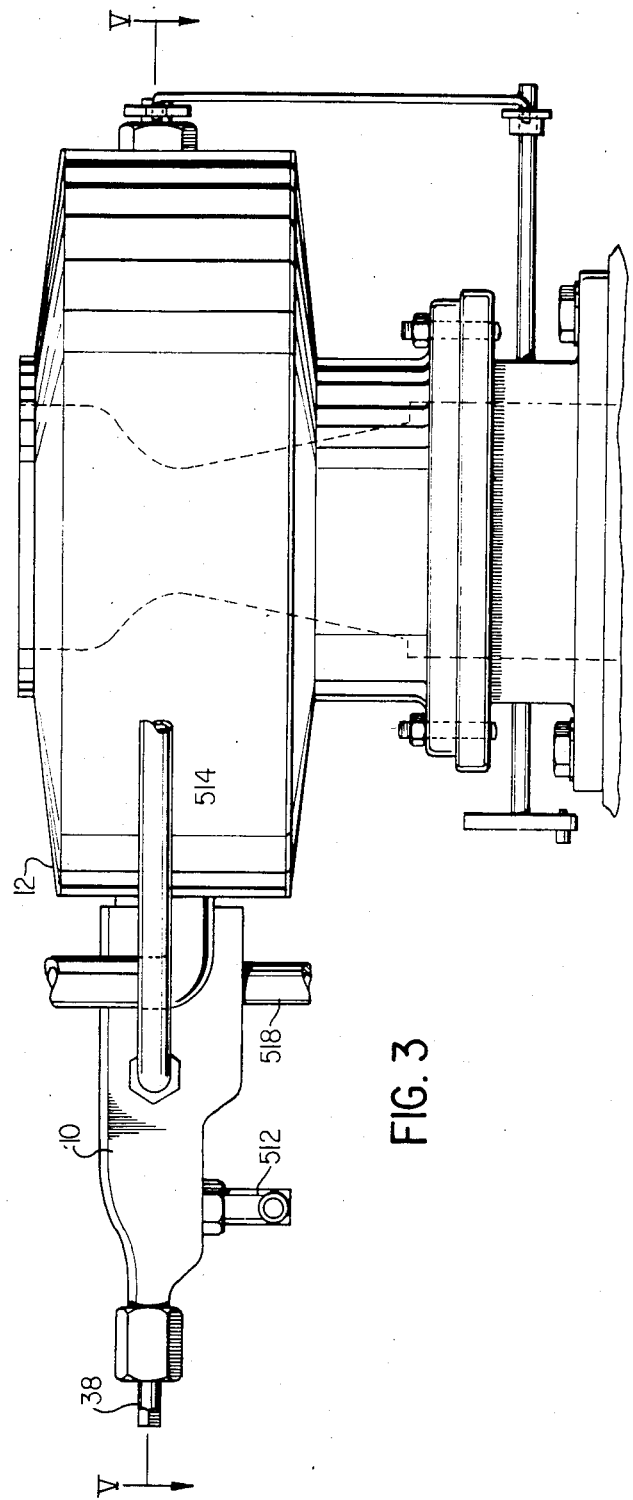
FIG. 3 is a side view of the fuel vapourizer and mixing chamber of the preferred embodiment.

Further fine control over the passage of fuel into mixing chamber 42 is accomplished with the needlelike end 63 of shaft 38; and metering jet 64 which is threadably fitted into vapourizer 10, as shown at 66 (FIG. 4). Metering jet 64 has an orifice 68 for metering the passage of vapourized fuel. This metering effect may be controlled by interchanging jet 64 with other jets having orifices of different diameters. Further control over the metering action is provided by the mating of needle valve end 63 with metering jet 64. More particularly, the displacement between needle valve end 63 and metering jet 64 may be varied by threadably rotating the end of shaft 38 which protrudes from vapourizer 10 as may be seen in FIGS. 2, 3 and 4.

As may be seen in FIG. 4, hot exhaust gases obtained from the exhaust manifold of engine 500 are directed through the body of vapourizer 10 via a stainless steel exhaust gas line 518. After passing through the body of vapourizer 10 the hot exhaust gases are passed through conduit 520 (FIG. 5) which communicates with a passageway provided in casing 42 and encircling mixing chamber 12. Casing 42 is thus heated and radiates its heat into mixing chamber 12 to heat the vapourized fuel/air mixture.

Figure 6:
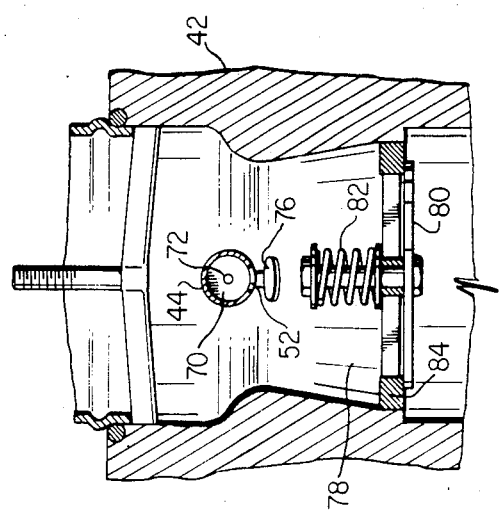
FIG. 6 is a cross-sectional view taken with respect to the line VI—VI shown in FIG. 5; and, FIG. 7 is a cross-sectional illustration of a thermostatically controlled air inlet means for use with the preferred embodiment.

As illustrated in FIG. 6, fuel passed through orifice 52 encounters baffle plate 76, which helps to diffuse the fuel stream, particularly when engine 500 is cold. After passing through venturi portion 78 of mixing chamber 12, the fuel encounters a check valve 80 having a spring 82 which holds valve 80 closed against apertured plate 84 unless the vacuum created by engine 500 is sufficient to enable the air pressure on the spring side of valve 80 to overcome the spring biasing action to open the valve.

Further dispersion of the fuel/air mixture is achieved by forcing the fuel around valve 80 and plate 84.

As may be seen in FIGS. 1 and 7, ambient air passes through duct 16 to heat exchanger 18 (which may be fastened to a hot engine part such as the exhaust manifold). The ambient air is heated to about 180° F. by heat exchanger 18 and is then conveyed by conduit 20 to air inlet duct 14, air filter 522 and to mixing chamber 12. Thermostat 71 is positioned within air cleaner 523 and is mechanically coupled via linkage 74 to a damper 76 which is pivotally mounted inside air inlet duct 14. If the temperature of the air surrounding thermostat 71 is below about 180° F. then thermostat 70 forces linkage 74 to the left (as viewed in FIG. 7), thereby causing damper 76 to block the opening of air inlet duct 14, thus inhibiting cool ambient air flow into mixing chamber 12 and diverting warm air from conduit 20 into mixing chamber 12. However, if the temperature of the air surrounding thermostat 71 rises above about 180° F. then thermostat 70 forces linkage 74 to the right (as viewed in FIG. 7) thereby causing damper 76 to close off conduit 20 and thus admitting cool ambient air from inlet duct 14 to mixing chamber 12. The temperature of air admitted into mixing chamber 12 is thus maintained near the preferred 180° F. temperature.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

I claim:

1. Apparatus for supplying a gaseous fuel mixture to a combustion chamber, said apparatus comprising:
    (a) a fuel vapourizer for vapourizing liquid fuel;
    (b) a mixing chamber for mixing said vapourized fuel with air;
    (c) heating means for heating said vapourizer and said mixing chamber; and,
    (d) valve means for interconnecting said vapourizer and said mixing chamber; said valve means for controlling the quantity of vapourized fuel discharged into said mixing chamber;

wherein said vapourizer and said mixing chamber are interconnected such that vapourized fuel produced by said vapourizer is discharged directly into said mixing chamber and thence directly into an intake manifold of said combustion chambers.

2. Apparatus as defined in claim 1, wherein said valve means comprises:
    (a) a tubular sleeve having an open first end, a closed second end, and a fuel delivery orifice between said first and second ends; and,
    (b) a control element slidably disposed within said sleeve to controllably cover and uncover said fuel delivery orifice.

3. Apparatus as defined in claim 2, further comprising a needle valve for controlling the quantity of fuel vapourized by said vapourizer.

4. Apparatus as defined in claim 3, further comprising a restrictor for restricting passage of liquid fuel into said fuel delivery orifice.

5. Apparatus as defined in claim 1, further comprising steam injection means for controllably injecting steam into said mixing chamber.

* * * * *